United States Patent [19]

Falck et al.

[11] Patent Number: 4,514,731
[45] Date of Patent: Apr. 30, 1985

[54] CODED INFORMATION ARRANGEMENT

[76] Inventors: John B. Falck, 111 St. George's Dr., London SW1; David Robson, 8 Conyers Way, Great Barton, Suffolk, IP31 2RL, both of England

[21] Appl. No.: 398,276

[22] Filed: Jul. 14, 1982

[30] Foreign Application Priority Data

Jul. 14, 1981 [GB] United Kingdom ................ 8121640

[51] Int. Cl.³ .................... H04Q 9/00; G08B 29/00
[52] U.S. Cl. ............................ 340/825.08; 340/636; 340/663; 340/825.54
[58] Field of Search ............. 340/825.08, 825.54, 340/636, 505, 663, 346, 825.49; 455/38

[56] References Cited

U.S. PATENT DOCUMENTS

| 3,806,874 | 4/1974 | Ehrat. | |
|---|---|---|---|
| 3,858,212 | 12/1974 | Tompkins et al. | 455/38 |
| 3,859,624 | 1/1975 | Kriofsky et al. | |
| 4,092,524 | 5/1978 | Moreno. | |
| 4,160,246 | 7/1979 | Martin | 340/636 |
| 4,260,983 | 4/1981 | Falck et al. | |
| 4,325,146 | 4/1982 | Lennington | 340/636 |
| 4,358,756 | 11/1982 | Morel et al. | 340/539 |
| 4,388,615 | 6/1983 | Ford et al. | 340/636 |
| 4,399,437 | 8/1983 | Falck et al. | 340/825.54 |

FOREIGN PATENT DOCUMENTS

| 0013706 | 8/1980 | European Pat. Off. . |
| 2739660 | 3/1978 | Fed. Rep. of Germany . |
| 2368767 | 5/1978 | France . |
| 766264 | 10/1976 | South Africa . |
| 1543910 | 4/1979 | United Kingdom . |
| 1567750 | 5/1980 | United Kingdom . |
| 1573183 | 8/1980 | United Kingdom . |
| 2077556 | 12/1981 | United Kingdom . |

Primary Examiner—Donald J. Yusko
Attorney, Agent, or Firm—Cushman, Darby & Cushman

[57] ABSTRACT

An active transponder of an identification system comprises a memory for storing coded information and supplying it to a transmitter output, and data means independent of the memory for supplying further information to the output. The transponder has a battery and the data means can comprise detectors which detect when the voltage of the battery falls below respective predetermined levels. The data means can also comprise input connections arranged to receive signals representing the updated values of respective parameters. These signals are supplied to respective inputs of a data selector independently of the memory.

9 Claims, 6 Drawing Figures

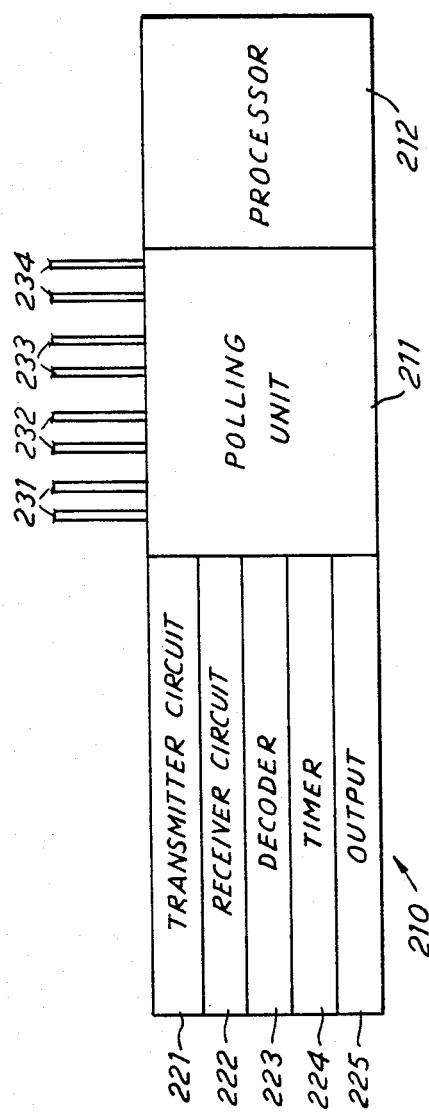
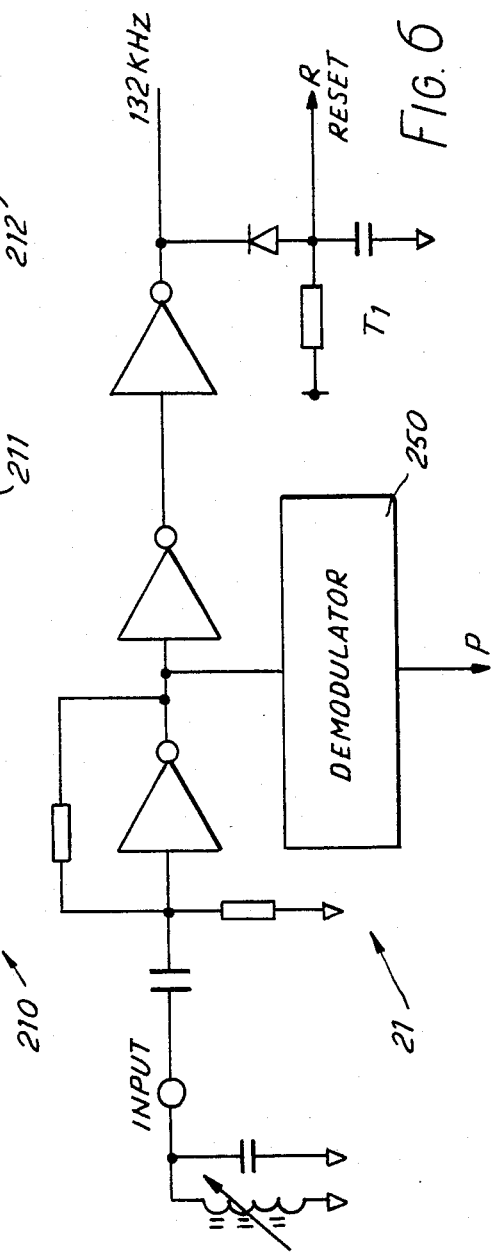

CODED INFORMATION ARRANGEMENT

BACKGROUND OF THE INVENTION

The present invention relates to coded information arrangements. The arrangement may be similar to those disclosed in our co-pending U.S. application Ser. No. 265,324 (which issued as U.S. Pat. No. 4,399,437 on Aug. 16, 1983) corresponding to published United Kingdom application No. G.B. 2077556.

Devices for supplying coded information are frequently battery powered. With such devices there is a danger that, due to insufficient battery voltage, the device may malfunction and the information supplied may be degraded, possibly without the user being aware of this. Such devices also often require a separate programming unit to change the coded information stored therein even if only a small part of the information is to be changed. This can be an inconvenient and time-consuming process, and the programming units required are expensive. Furthermore, there is the further disadvantage that the coded information cannot be coded in real time.

SUMMARY OF THE INVENTION

The present invention seeks to overcome or reduce one or more of the above disadvantages.

According to the invention there is provided an active device comprising a memory storing coded information and having an output, said coded information being supplied at said memory output, data means for supplying further information and having an output, said further information being supplied at said data means output independently of said memory, a transmitter, said transmitter having an input, and means for connecting said memory output and said data means output to said transmitter input, whereby said transmitter is arranged to transmit an output signal including said coded information and said further information. Said memory output and said data means output may be connected to said transmitter input directly or indirectly.

Basically the present invention provides an active device comprising a memory for storing and supplying coded information, data means for supplying further information independently of the memory, and a transmitter arranged to transmit an output signal including said coded information and said further information.

The outputs of the memory and the data means are preferably connected to corresponding inputs of data selector means, the input of the transmitter being connected, directly or indirectly, to the data selector means.

The information in the memory is preferably changeable only by the use of a separate programming unit; such an arrangement has the advantage that the further information supplied by the data means may be modified without necessitating the use of the programming unit.

The active device may comprise a battery in which case the further information supplied by the data means may relate to the state of the battery, i.e. the battery voltage. Alternatively or in addition and further information may represent automatically updated values of parameters such as temperature, voltage, pressure etc.

Thus in one preferred embodiment, the active device comprises a memory for storing information, transmitter means for transmitting an output signal including said information, a battery, and means for detecting when the battery voltage falls below a predetermined level, the battery voltage detecting means being arranged to modify said output signal when the battery voltage falls below said predetermined level. The detecting means may be arranged to alter the value of a single bit in the output signal. Alternatively the detecting means may be used to convert the output signal to a signal of constant value. In a preferred arrangement there are two battery-voltage detecting means, a first of which alters the value of a single bit in the output signal when the voltage falls below a first predetermined level, and the second of which converts the output signal to a constant data value when the voltage falls below a second predetermined level which is itself below said first predetermined level.

In another preferred embodiment, the active device comprises means for receiving an input signal including coded information from a programming unit, a memory comprising means for storing said information, and means for directly receiving further information independently of said programming unit. Said further information may comprise one or more bits, each indicating an "on/off" or, "yes/no" condition, for example the output of an alarm device. Alternatively or in addition, the further information may comprise digital values representing one or more variable parameters.

The device according to the present invention is preferably an active transponder device which may comprise first signal input means, second signal input means and an output which, in response to signals received by said first input means, transmits output signals including the coded information stored in the memory. In a preferred method of storing information in the memory of the device, coded signals containing said information are supplied to said second input means.

In a preferred arrangement uncoded signals are supplied to said first input means simultaneously with the coded signals being supplied to said second input means. Said uncoded signals may be a regular pulse train and said coded signals may be irregular coding pulses and the bits of information successively stored in the memory may correspond to successive values derived from within the transponder device of said uncoded signal when a coding pulse is supplied to said input means.

The device may comprise signal input means and a memory protection circuit for preventing undesired changing of the coded information stored in the memory wherein when it is desired to change the stored information a predetermined series of pulses must be applied via the signal input means to the memory protection circuit and wherein the memory protection circuit includes means for comparing both the number and the timing of pulses actually applied to the input means with the number and the timing of the predetermined series. The device may comprise further signal input means connected to signal processing circuitry which, upon the application of a signal to said further input means, automatically supplies the memory protection circuit with said predetermined series of pulses.

The predetermined series of pulses may define a corresponding series of windows during which the actual pulses must occur, and the memory protection circuit may include means for checking that no pulses occur between the windows, and/or means for checking that at least one pulse appears in each window, and/or means for checking that no more than one pulse appears in each window.

The device may comprise frequency division circuitry, the division ratio of which is adjustable.

Coded information is preferably supplied to the memory of the active device by means of a programming unit. The memory preferably comprises at least two groups of bits of information and the coded information is supplied to only one of said groups, the information in the remaining group(s) remaining unaltered. To prevent undesired changing of the information stored in the memory of an active device by a programming unit, the contents of a part of said memory are read by the programming unit and the unit then determines whether it is allowed to change said information.

Where the device is an active transponder it may comprise a first circuit for supplying regular pulse trains and a second circuit for supplying spaced pulses, the first and second circuits having a single input for receiving modulated signals, and the second circuit being connected to the input via a demodulator. The demodulator may be an amplitude, phase of frequency demodulator. The spaced pulses may be programming clock pulses.

A coded information detecting system may comprise:

(i) a plurality of active transponder devices according to the present invention, each comprising a receiver, and a transmitter for transmitting in response to an input signal received by the receiver an output signal including said coded information and said further information, (ii) an interrogator unit which is arranged to provide said input signal and detect said output signal, and which includes decoding means, and (iii) a polling unit which is arranged to supply said input signal from said interrogator unit successively to each one of a plurality of aerial units at separate sites, and to return any received output signal from a transponder to the interrogator unit, wherein the decoding means includes means for detecting whether an initial transponder output signal is received from an aerial unit and means responsive to said detecting means which, in the presence of a transponder output signal, allows the polling unit to supply the coded information from the memory of the transponder to the interrogator unit and which, in the absence of a transponder output signal, instructs the polling unit to skip immediately to the next aerial unit.

BRIEF DESCRIPTION OF THE DRAWINGS

A preferred embodiment of the present invention will now be described by way of example only with reference to the accompanying drawings of which:

FIG. 5 shows an interrogator terminal unit for use in connection with coded tags; and FIG. 6 shows a modification of the input circuitry of the tag.

DETAILED DESCRIPTION OF THE PREFERRED EMBODIMENTS

Figure 1:
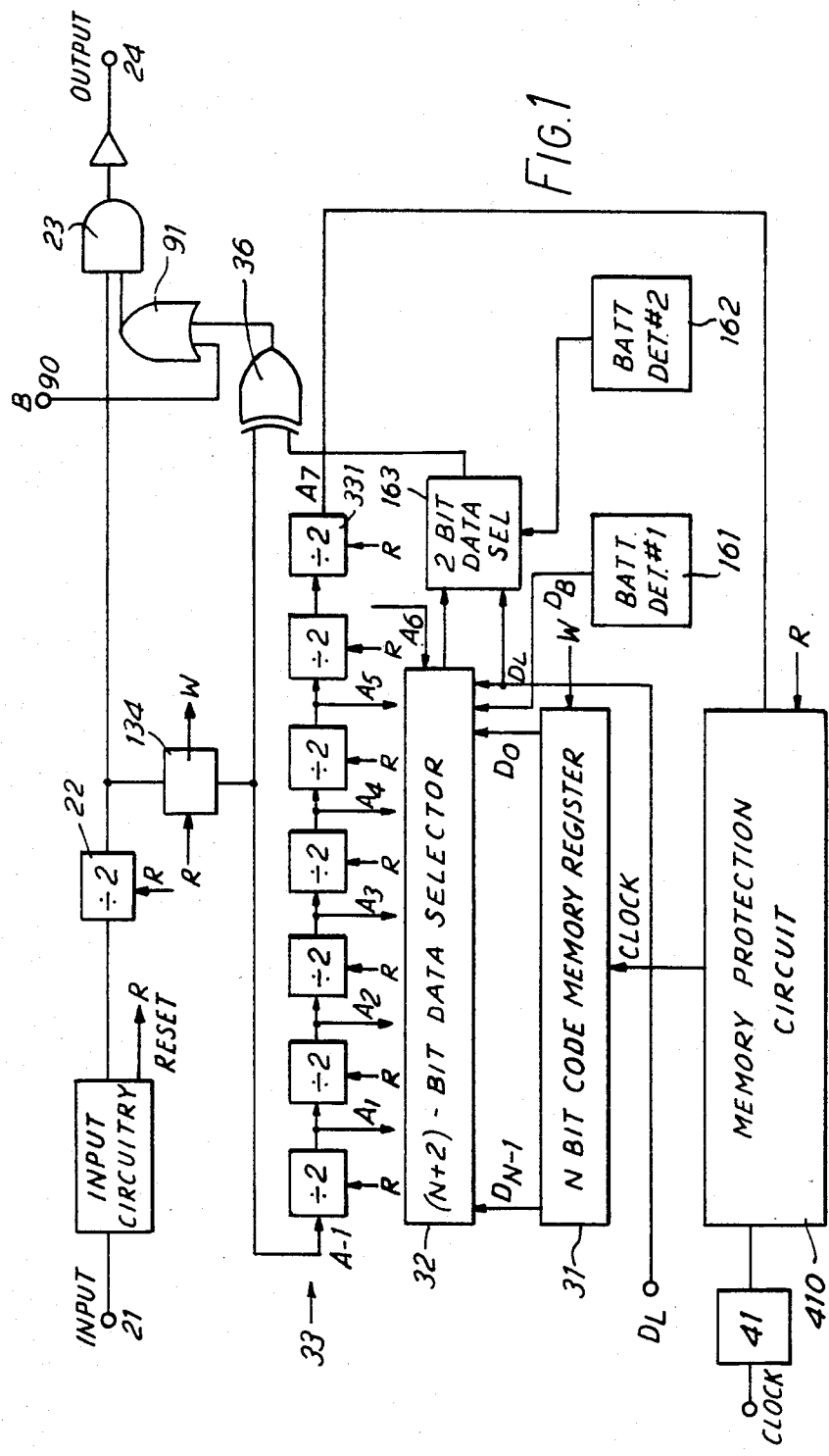
FIG. 1 shows a block diagram of a programmable coded tag in accordance with the present invention.
Figure 2:
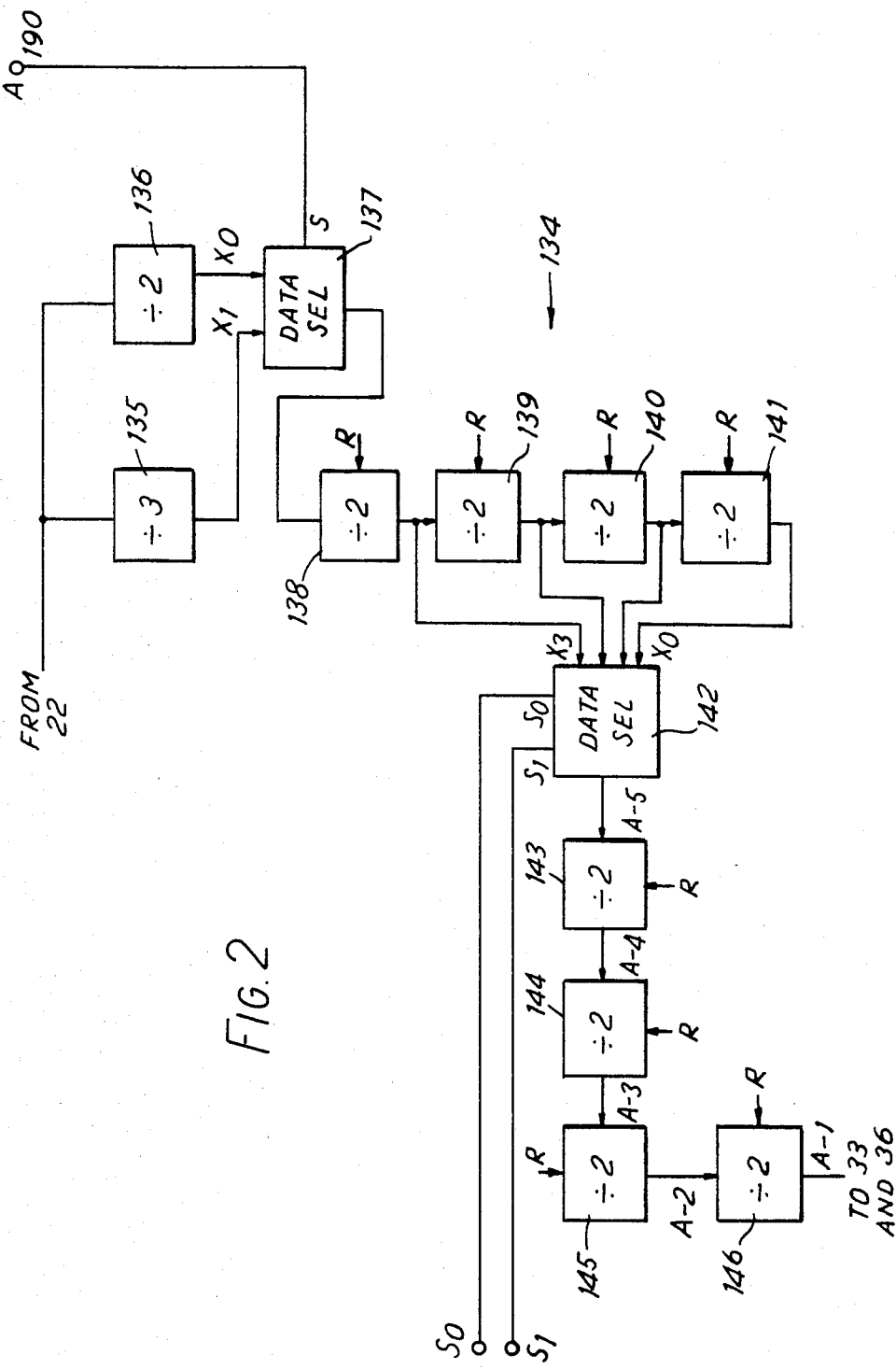
FIG. 2 shows a block diagram of frequency division circuitry forming part of the tag of FIG. 1.

Referring now to FIG. 1 there is shown the circuitry of a coded tag. Many components are the same as described in connection with FIG. 1 of the above-mentioned co-pending application and thus will be described only briefly. 132 KHz signals are supplied from an interrogator unit to an input 21. In the absence of such signals, the input circuitry generates a reset signal R for the tag circuitry. The 132 KHz signals pass to a frequency translator (divide-by-two counter) 22 connected to an AND gate 23, the output of which is connected to a transmitter output 24. The 132 KHz signals are also supplied to frequency division circuitry 134, which is shown in greater detail in FIG. 2.

The circuit 134 comprises a divide-by-3 counter 135 and a divide-by-2 counter 136, the output of one of which is selected by a data selector 137 whose set-input is connected to a terminal 190. The output division selector is connected to a frequency division chain comprising divide-by-2 counters 138–141, the output of one of which is selected by a data selector 142. Selector 142 has two set inputs $S_0$, $S_1$ and its output is connected to a further frequency division chain comprising divide-by-2 counters 143–146. The output W of one of the counters is supplied to the coding input of register 31.

Referring again to FIG. 1, the signal from counter 146 constitutes the output of circuit 134 and is supplied to an index counter 33 and to one input of a half-bit (or HABIT) former 36, which is an exclusive-OR gate. The index counter comprises seven divide-by-two counters, six of which supply respective signals A1–A6 to inputs of a data selector 32 and the seventh of which, counter 331, supplies a signal A7 to memory protection circuitry 410.

The data selector 32 has a first data input $D_L$, a second data input $D_B$ and N data inputs corresponding to a code stored in an N-bit memory register 31. Input $D_L$ is strapped to the value logic '1' or logic '0' depending on whether it is required that the information arrangement is intended to detect the presence of programmable tags using the presence sensing system as described in U.S. Pat. No. 4,260,983 to Falck et al, corresponding to United Kingdom patent application GB2017454A.

The second input $D_B$ is connected to the output of a battery voltage detector circuit 161 which is arranged to give a logic '1' signal when the battery voltage is low.

The output of (N+2)-bit data selector 32 is supplied to a first signal input of a 2-bit data selector 163. The input $D_L$ is connected to the second signal input of a selector 163, and the output of a second battery voltage detector circuit 162 is connected to the selecting input. Detector 162 is arranged to select $D_L$ when the battery voltage reaches a low level. The output of selector 162 is connected to the second input of the half-bit former 36. The output of half-bit former 36 is connected to the first input of an OR gate 91. The second input of OR gate 91 is connected to a terminal 90, which is preferably constituted by an external pin of the tag chip. The pin is normally down-bonded to the logic value '0' so that the OR gate 91 functions as a straight through connection from half-bit former 36 to the second input of AND gate 23. If terminal 90 is strapped to logic value '1', the tag behaves as an uncoded, presence-sensing device.

Clocking signals for the register 31 are supplied by a clock receiver input 41. Before being fed to the register, the clock signals pass through a memory protection circuit 410, which prevents accidental and/or unauthorised changes to the code held by the register.

Figure 3:
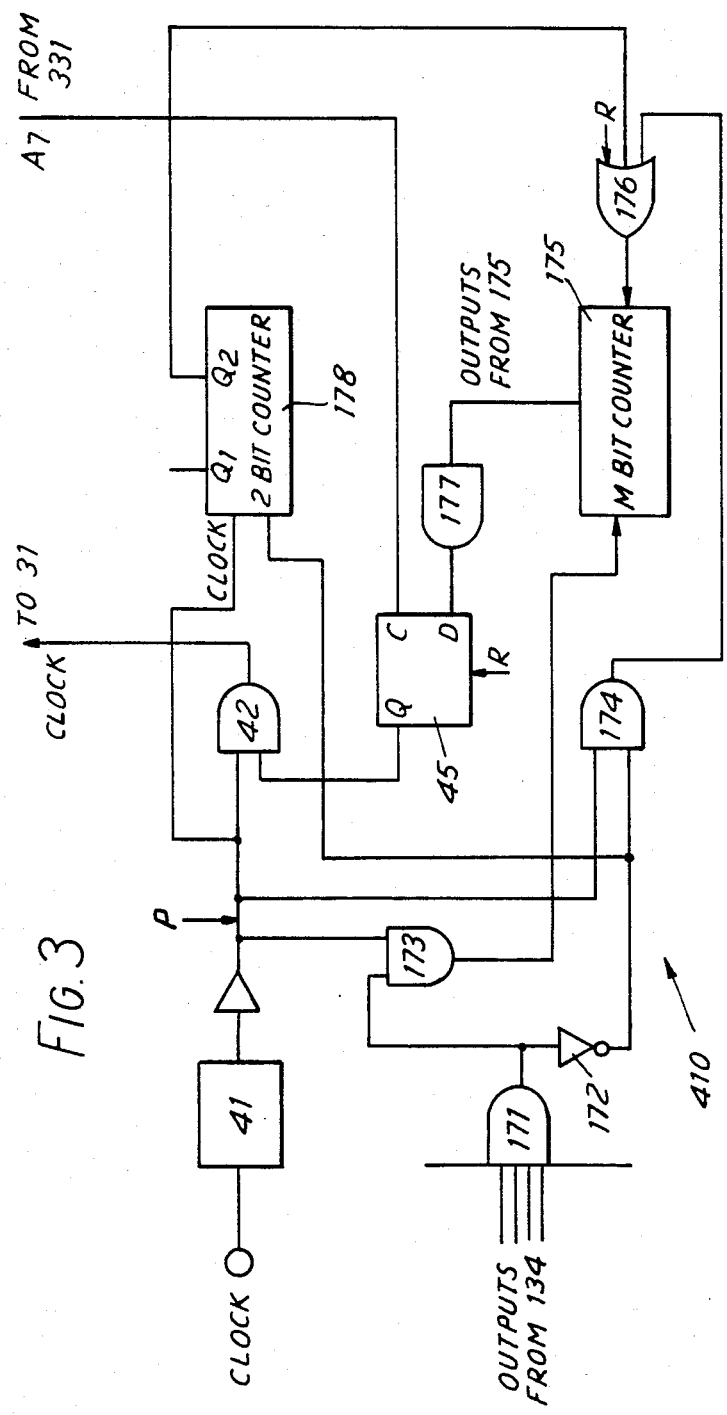
FIG. 3 shows a block diagram of memory protection circuitry forming part of the tag of FIG. 1.

Circuit 410 is shown in greater detail in FIG. 3. Clock pulses from a programming unit (not shown) arrive at input 41 and are supplied to:

(i) a first input of an AND gate 173;
(ii) a first input of an AND gate 174;
(iii) a first input of an AND gate 42; and
(iv) a clock input of a 2-bit counter 178.

Connected to the second input of AND gate 173 is the output of a further AND gate 171. The inputs of gate 171 are sinals derived from the frequency division circuitry 134. The output of AND circuit 171 is also supplied, via an inverter 172, to, the second input of AND gate 174.

The output of AND gate 173 is connected to the counting input of an M-bit counter 175. Counter 175 has all its outputs connected to an AND gate 177. It also has a reset input which is the output of an OR gate 176. A first input of OR gate 176 is the reset signal R from the input circuitry of the tag and a second input signal is the output of AND gate 174.

The output of AND gate 177 is connected to the D-input of a D-type flip-flop circuit 45. The clock input of circuit 45 receives the signal $A_7$ from counter 331 of the index counter, and its output is connected to the second input of AND gate 42. The output of AND gate 42 constitutes the clock input to register 31.

The output of inverter 172 is also supplied to the reset input of 2-counter 178. The counter has a blind first output $Q_1$ and a second output $Q_2$ which forms a further input signal for the OR gate 176 which resets counter 175. During the first phase of the programming sequence in which a new code is entered in register 31, a 132 KHz signal is supplied at 21 for a time corresponding to approximately two interrogation cycles. This automatically produces L shift pulse windows. The programming unit, which includes means duplicating the frequency division circuitry of the tag produces one clock or shift pulse within each of the shift pulse windows, and at the end of the first phase signal $A_7$ attains the logic '1' level. This clocks flip-flop 45 which opens AND gate 42 of the memory protection circuitry to pass clock pulses to register 31.

During the second phase of the programming sequence, N shift pulses are applied to the register 31 at intervals determined by the desired code. This phase is described in greater detail below. At the end of the second phase, the 132 KHz is removed which has the effect of resetting the circuitry of the tag, and in particular signal $A_7$ and the memory protection circuit 410.

During the third phase of the programming sequence, two (or more) interrogation cycles are performed on the tag, the results are compared with the desired code, and if the entered code is correct a data valid signal is given by the programming unit.

Various aspects of the operation of the coded information arrangement described above will now be discussed in greater detail.

1. Battery Status Indication

Prevention of faulty operation of the tag due to run down of its battery will now be described. The first battery-voltage-detector 161 normally supplies a logic '0' signal to input $D_B$ of data selector 32 (corresponding to bit 2 of the code of the tag). When the voltage of the battery falls below a first level the output of the detector 161 changes to logic '1'. The tag is still fully operational at this stage. When its code is read by the decoder of the interrogator, the presence of a logic '1' at bit 2 is used to activate means to indicate that the voltage of the battery is low and that is should be replaced.

If the battery voltage falls below a second level, which is itself below the first level, this is detected by the second battery-voltage-detector 162. The output of detector 162 changes and triggers data selector 163 so that instead of supplying coded signals to half-bit former 36 the selector supplies continuous '0s' or continuous '1s' to the transmitter 24 depending on the value of inputs $D_L$. Thus when the tag is interrogated it is immediately apparent that the battery has rundown.

An advantage of this arrangement is that degraded or incorrect coded information cannot be supplied to the interrogator for processing; this could occur if the circuitry of the tag was allowed to continue to function in its normal fashion as the battery ran down. The two-stage indication permits replacement of the battery before the tag stops working correctly. Of course, if desired, either of the stages could be used on its own.

2. Direct Programming

Figure 4:
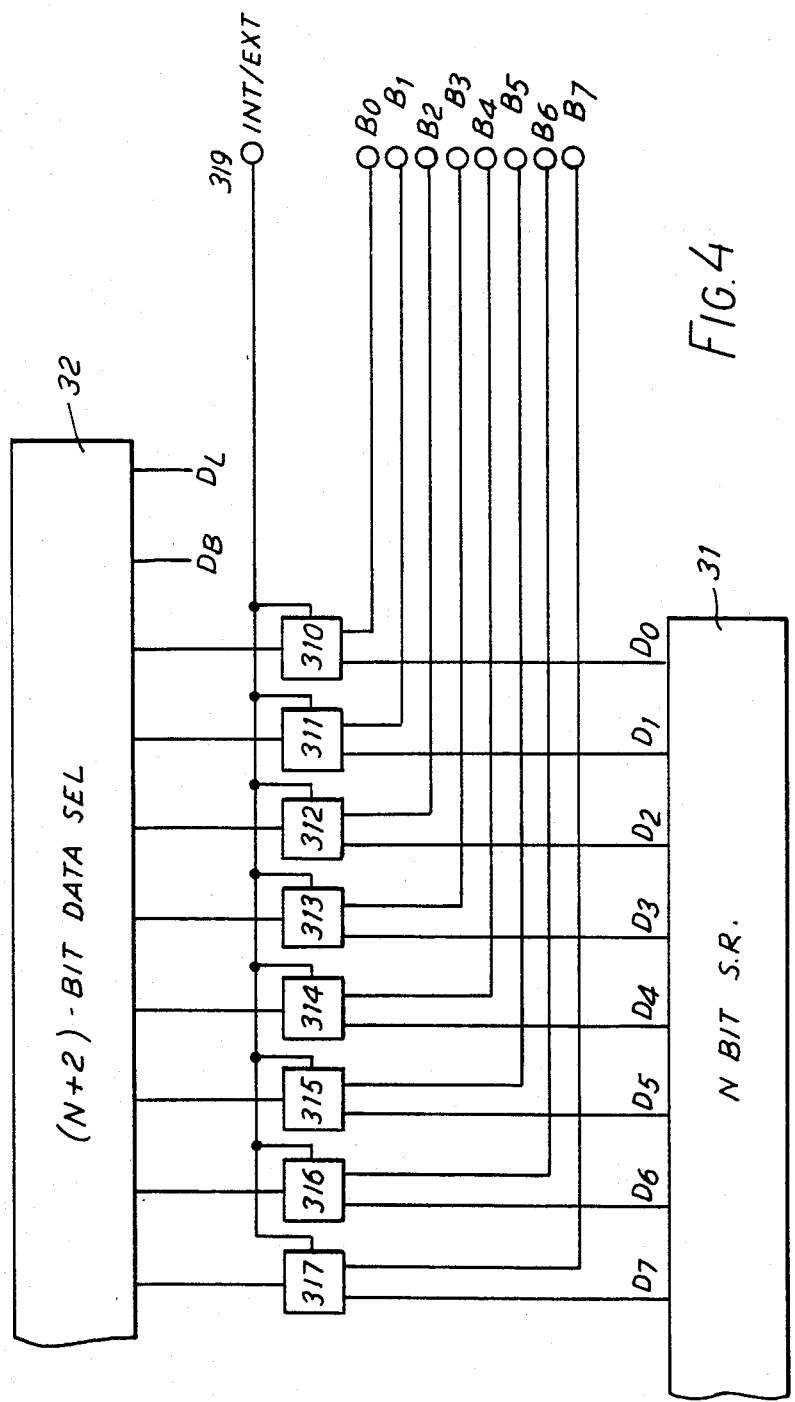
FIG. 4 shows a block diagram of a modification of the tag.

It may be arranged that some of the bits in the code may be directly programmed via external terminal pins of the tag itself, without the need for a programming unit. Such an arrangement is depicted in FIG. 4 where there is direct parallel axis to the leading 8 bits of the code supplied to data selector 32 via terminal pins B0–B7. For normal use, as described previously, pins B0–B7 and select input 319 are 'down-bonded' so that the first eight outputs D0–D7 from register 31 are supplied to selector 32 via data selectors 310–317. When the select input 319 for selectors 310–317 is made logic '1', the signals, if any, from inputs B0–B7 are supplied to selector 32. Signals at these inputs may represent the automatically updated values of parameters such as temperature, voltage, pressure etc., which may be converted to a digital word for direct inclusion in the code data stream when the tag is interrogated. Thus part of the coded information can be changed in real time. Alternatively one or more inputs may be used to indicate whether a particular parameter has exceeded a predetermined value, and may for example indicate an alarm condition. More than one select input 319 may be provided if desired.

As shown in FIG. 4 the direct programming feature is combined with the battery-voltage indication feature; the latter feature, however, may be omitted.

3. Programming the Tag

In the arrangement disclosed in the above-mentioned U.S. Pat. No. 4,399,437 to Falck et al, the tag 20 was coded or programmed by a coded data stream from a separate programming unit. The coded signal was supplied to input 21 and was clocked into register 31 by signals supplied by a clock receiver input 41. In the arrangement according to the present invention an uncoded 132 KHz signal is supplied to input 21 and to the programming unit.

The 132 KHz signal is supplied to frequency division circuitry 134. An output from a counter inside circuitry 134 is used to supply data pulses W to the input of register 31.

As stated above the programming unit includes frequency division means which corresponds to the circuitry of the tag, and which may be hardware or software. The data pulse W alternately has logic values '1' and '0'. If, when coding the tag, the next bit of the code to be encoded is logic '1', the unit supplies a clock or shift pulse to detector 41 only when the data pulse W has the value '1'. This arrangement has the advantage that the detector circuitry 29 of the earlier arrangement is not required. It is only necessary that a clock pulse occurs during the window defined by the interval that the data pulse W has the desired value. In addition great precision in the timing of the clock pulse is not required.

4. Memory Protection Circuitry

As disclosed in the above-mentioned U.S. Pat. No. 4,399,437, coding of the tag is preceded by an interval corresponding preferably to two full interrogation transmission times. During this interval, it is checked that the correct number of clock pulses arrive at input 41. Only the total number of clock pulses is counted, however, and their timing is not checked. The way in which the memory protection circuit of the present invention functions will become apparent from the following description of programming the tag.

During the set-up interval before the tag is coded, L clock or shift pulses are applied via input 41 to a first input of AND gate 173. To the second input of gate 173 are applied pulses defining the windows in which the clock pulses must occur for programming to proceed. The shift pulse windows are defined by outputs taken from selected points of the frequency division circuitry. Since the frequency division circuitry is reproduced in the programming unit, the unit can supply the clock pulses precisely within the windows.

The output of AND gate 173 is supplied to the counting input of an M-bit counter 175 whose outputs are connected to AND gate 177. When the L pulses have been correctly counted, gate 177 supplies an output logic '1' to the input of D-type flip-flop 45.

The output of gate 171 is also supplied via an inverter 172 to a first input of AND gate 174, the output of which is connected to an OR gate 176 connected to the reset input of counter 175. The clock pulses from input 41 are supplied to the second input of gate 174. Thus should a clock pulse appear which is not simultaneous with a window pulse, counter 175 will be reset, flip-flop 45 will not be actuated and recoding of the tag will be prevented.

The output of inverter 172 is also supplied to a reset input of 2-bit counter 178. Thus at the end of each window pulse, counter 178 is reset to zero. The clock pulses are supplied to a count input of counter 178. If the correct clock-pulses are supplied, only one pulse will be supplied to counter 178 between each reset operation thereof, and logic '1' will appear only at the blind output $Q_1$ of the counter. If, on the other hand, two clock pulses are supplied between successive reset operations of the counter, a logic '1' will appear at output $Q_2$ of counter 178 which is connected to OR gate 176 to reset the counter 175. Thus should an incorrect extra clock pulse occur, counter 175 will reset and recoding of the tag will be prevented even if the extra clock pulse occurs along with a correct pulse within a 'window' set by the pulses from gate 171.

If no clock pulse appears at input 41 within the interval set by the window pulse, counter 175 will not be actuated and thus will not be able to count up to the correct number of L pulses. Thus flip-flop 45 will not be actuated and recoding of the tag will be prevented.

Thus during the set-up period immediately preceding coding, the memory protection circuit of the present invention requires that clock pulses are supplied at the correct instant, that only one clock pulse is supplied at a time, and that no extra pulses are supplied between the correct instants.

During the set-up interval a 132 KHz signal is applied to input 21 and thus after a time equivalent to two interrogation cycles, the end counter 331 of the index counter 33 gives a logic '1' output A7, which is supplied to the clock input of flip-flop 45. Providing flip-flop 45 has been actuated by counter 175 a logic '1' signal will be applied to a first input of AND gate 42. Subsequent clock pulses are supplied to the second input of AND gate 42 at points in time corresponding to the new code that it is desired to insert into register 31. When the code has been stored, the 132 KHz signal is removed from input 21, which has the effect of applying a reset signal to all the counters in the frequency division chain (including counter 311), flip-flop 45 and OR gate 176. Thus signal A7 becomes logic '0' and AND gate 42 no longer passes clock pulses to the register 31. Two interrogation cycles are then effected, the signals tranmitted by the tag are compared with the correct code, and if the information has been coded correctly, means on the programming unit is activated to indicate satisfactory coding and that the data is valid.

5. Selectable Division Ratio

The frequency division ratio of circuitry 134 (i.e. between frequency divider 22 and index counter 33) may be arranged to be selected to have one of a plurality of values. For example in an electrically noisy environment it may be required to have a slower bit rate, which corresponds to a higher division ratio. To this end data selectors 137 and 142 are provided.

A set input of selector 137 is coupled to a terminal 190 of the tag. Terminal 190 is a preferably constituted by an external pin of the tag chip. The pin is preferably down-bonded that is it applies a logic signal '0' to select input X1 of selector 137. This connects divide-by-3 counter 135 into the frequency division circuitry. To change the division ratio terminal 190 may alternatively be connected to give a logic '1' signal which selects input X0 and divide-by-2 counter 136. Data selector 142 has two set inputs $S_1$, $S_0$ corresponding to four counter inputs X0–X3. Inputs $S_1$, $S_0$ are connected to respective terminal pins 192,193 which are both preferably down-bonded to select input X1 and the output from divide-by-2 conter 140, thus excluding conter 141 from the frequency division chain. To select another counter input of selector 142 pin 192 and/or pin 193 are connected to give a logic '1' signal. With counter input X1 selected for both selectors 137, 142 a division ratio of 384 is achieved, that is the same as in the above-mentioned U.S. Pat. No. 4,399,437 to Falck et al.

6. Selective Coding

If desired, a part only of the register 31 may be coded during a programming cycle. Thus it may be arranged that a particular programming unit is only able to recode, say, the first 16 bits of information or predetermined groups within the first 16 bits. The other (N−16) bits may be fixed at the stage of manufacture or may be coded and re-coded only by a master programming unit. It will be clear that there can be a hierachy or programming units each with the authority to change the code of a different number of bits.

The presence of 'fixed' bits in the register permits recoding of the tag to be restricted to one particular user. Before recoding is permitted it may be arranged that the tag is interrogated and that the coded signal transmitted by the tag is checked by the programming unit to determine whether the user of that particular unit is authorised to recode that particular tag. If the user is not so authorised, recoding of the tag is prevented; this provides a further memory-protection feature.

7. Presence-sensing Role

FIG. 5 indicates an arrangement in which a single interrogator circuit is used with a plurality of aerials. An interrogator circuit 210 is associated with a polling circuit 211 and a signal processor 212. The interrogator comprises a transmitter circuit 221, a receiver circuit 222, a decoder 223, a timing circuit 224 and an output circuit 225. The polling unit selectively connects the circuits 221, 222 to successive aerial pairs 231–234. Although only four sets are shown in practice a larger number of pairs may be used.

Unit 211 which may be under the control of processor 212, first connects aerial pair 231 to interrogate 210. Circuit 221 emits an interrogating pulse and circuit 222 receives the coded signal from any tag in the region of the aerial pair. Thus if a tag is present, circuit 222 receives two bits in habit format, the first bit $D_L$ indicating that a coded tag is present and the second bit $D_B$ indicating the condition of the battery. If decoder 223 detects that these two bits have not been received by circuit 222 it causes the polling unit to immediately stop the interrogation cycle. The next aerial pair 232 is then connected to circuit 210 and the interrogation cycle recommenced. Since the interrogation cycle takes a relatively long time, the provision of this skipping feature enables a large number of aerial pairs to be scanned by a single unit. The waste of time involved in interrogating empty sites is avoided.

8. Tag with single input

Although the tags described above and in the above mentioned U.S. Pat. No. 4,399,437 to Falck et al have separate interrogating and clocking inputs, these may be replaced by a single input as indicated in FIG. 6. A demodulator 250 is connected to a convenient point of the input circuitry 21. The output of the demodulator is connected to point P, FIG. 3 of the memory protection circuitry and the separate clocking input 41 is omitted.

The demodulator may be an amplitude demodulator, a phase demodulator or even a frequency demodulator providing the frequency shift is small enough so as not to upset the timings of the system. When it is desired to code the tag, suitable modulation of the 132 KHz signals is provided.

The features 3 to 8 above may be used in any desired combination with one or both of the features 1 and 2. Alternatively fearures 1 and/or 2 may be used with the rest of the coded information arrangement being as described in U.S. Pat. No. 4,399,437 to Falck et al.

It will be understood that the above description of the present invention is susceptible to various modification changes and adaptations.

We claim:

1. An active device having first and second input circuits, a frequency division circuit connected to said first input circuit, a memory for storing and supplying coded information and having a coding input, a clock input and an output, a transmitter, said transmitter having an input, and means for connecting said output of said memory to said input of said transmitter, said transmitter being arranged to transmit an output signal including said coded information, said second input circuit being connected to said clock input of said memory, wherein an output of said frequency division circuit is connected to said coding input of said memory.

2. An active device as claimed in claim 1 wherein said output of said frequency division circuit is from an intermediate part thereof.

3. A active device as claimed in claim 1 further comprising a memory protection circuit for preventing undesired changing of the coded information stored in said memory, said memory protection circuit being connected to said second input circuit and comprising means for comparing both the number and the timing of pulses actually applied to said second input circuit with the number and the timing of a predetermined series of pulses, whereby, when it is desired to change the information stored in said memory said predetermined series of pulses must be applied via said second input circuit to said memory protection circuit.

4. An active device as claimed in claim 3, wherein said memory protection circuit comprises logic means, said logic means being connected to selected points of said frequency division circuit whereby to determine said predetermined series.

5. An active device as claimed in claim 1 comprising data means for supplying further information and having an output, said further information being supplied at said data means output independently of said memory.

6. An active device according to claim 5 further comprising data selector means, said data selector means having at least first and second inputs and an output, said output of said memory being connected to said first input of said data selector means, said output of said data means being connected to said second input of said data selector means, and said output of said data selector means being connected to said input of said transmitter.

7. An active device as claimed in claim 6 and comprising further data selector means connected between said output of said data means and said second input of said first mentioned data selector means, said further data selector means also being connected to one or more respective outputs of said memory, said active device further comprising select input means for said further data selector means, whereby said second input of said first mentioned data selector means receives information either from said data means or from said respective outputs of said memory.

8. A method of supplying coded information to the memory of an active device having first and second input circuits, a frequency division circuit connected to said first input circuit, a memory for storing and supplying coded information and having a coding input, a clock input and an output, a transmitter, said transmitter having an input, and means for connecting said output of said memory to said input of said transmitter, said transmitter being arranged to transmit an output signal including said coded information, said second input circuit being connected to said clock input of said memory, wherein an output of said frequency division circuit is connected to said coding input of said memory, said method comprising supplying an uncoded signal to said first input circuit and supplying signals to said second input circuit at respective times when a signal at said output of said frequency division circuit has the same logic value as the next bit of code to be encoded in said memory.

9. A coded information system comprising an active transponder device having first and second input circuits, a frequency division circuit connected to said first input circuit, a memory for storing and supplying coded information and having a coding input, a clock input and an output, a transmitter, said transmitter having an input, and means for connecting said output of said memory to said input of said transmitter, said transmitter being arranged to transmit an output signal including said coded information, said second input circuit being connected to said clock input of said memory, an output from an intermediate part of said frequency division circuit being connected to said coding input of said memory, and a memory protection circuit for preventing undesired changing of the coded information stored in said memory, said memory protection circuit being connected to said second input circuit and comprising logic means connected to selected points of said frequency division circuit, and said memory protection circuit further comprising means for comparing both the number and the timing of pulses actually applied to aid second input circuit with the number and the timing of a predetermined series of pulses, said predetermined series being determined by said logic means, and a programming unit comprising clock signal supply means and a frequency division means, said frequency division means duplicating said frequency division circuit of said active transponder device and controlling the timing of signals from said clock signal supply means to said second input circuit of said active transponder device.

* * * * *